UNITED STATES PATENT OFFICE.

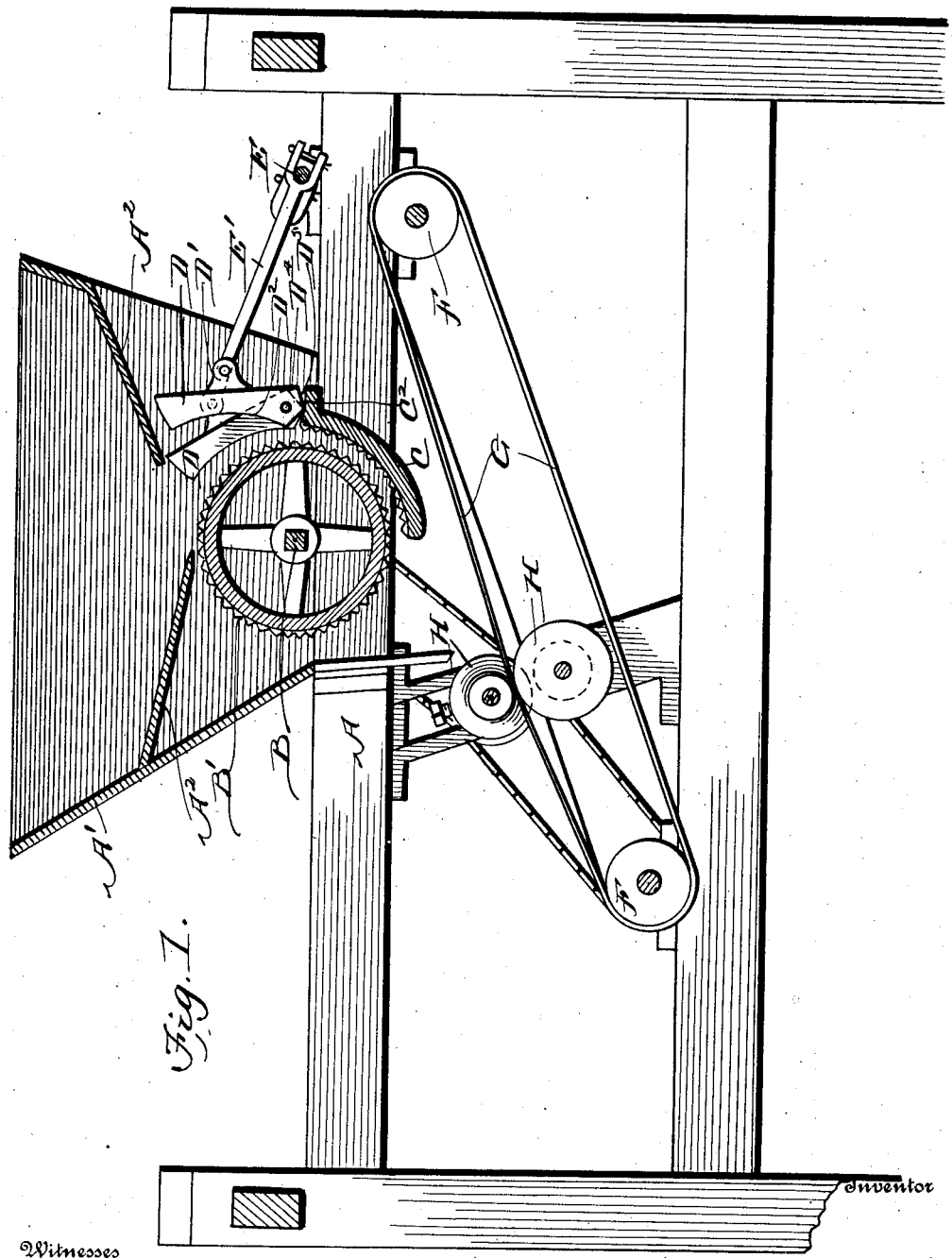

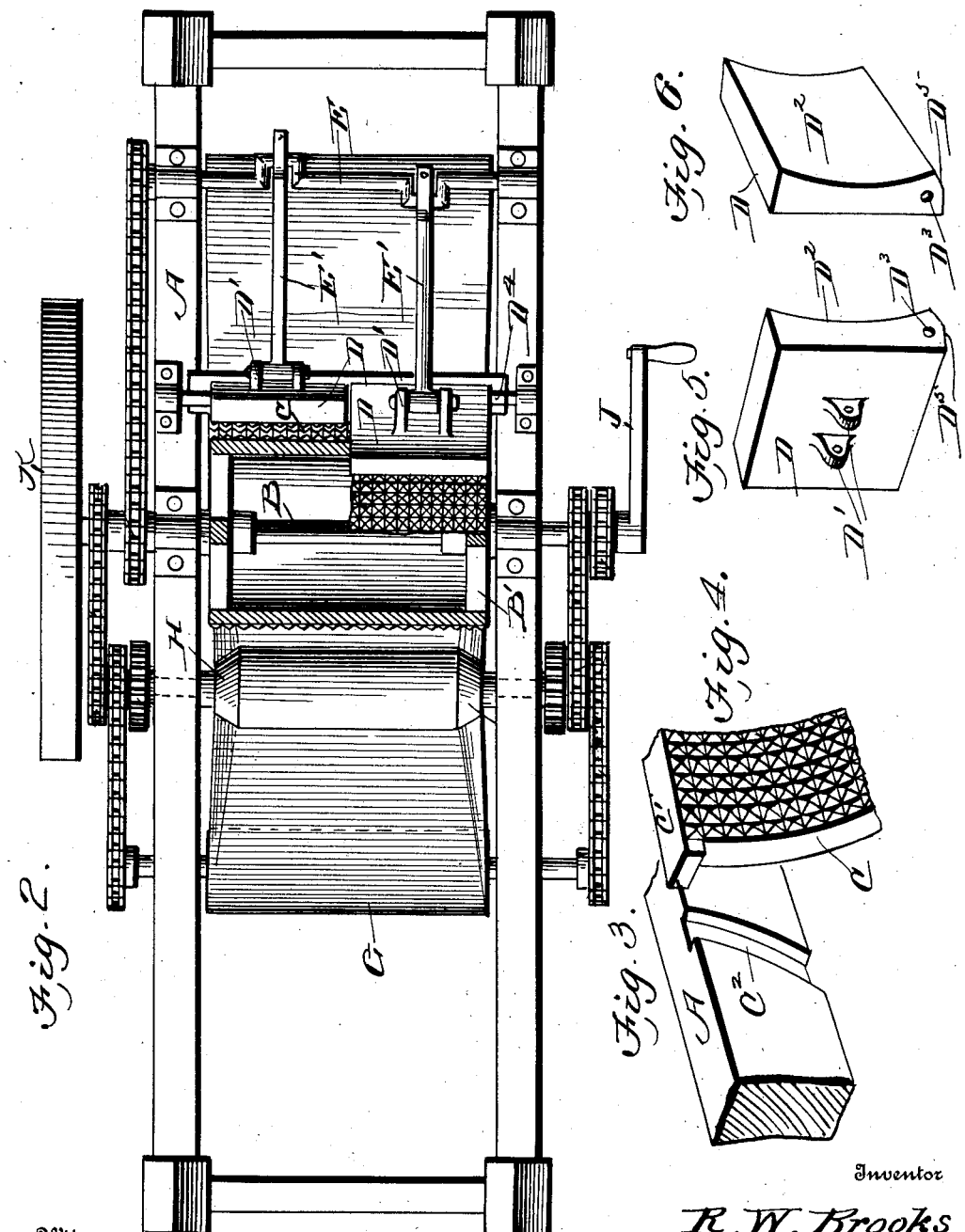

ROBERT W. BROOKS, OF LOUISVILLE, KENTUCKY, ASSIGNOR TO RHODA A. WENDLING, OF MAROA, ILLINOIS.

CIDER-MILL.

1,037,726.  Specification of Letters Patent.  Patented Sept. 3, 1912.

Application filed February 5, 1907. Serial No. 355,893.

*To all whom it may concern:*

Be it known that I, ROBERT W. BROOKS, a citizen of the United States, residing at Louisville, in the county of Jefferson and State of Kentucky, have invented a new and useful Improvement in Cider-Mills, of which the following is a specification.

This invention relates to a cider mill and the object of the invention is an improvement in the feeding and grinding mechanism whereby the apples are fed positively through the hopper and crushing mechanism.

The invention consists of the novel features of construction hereinafter described, pointed out in the claims and shown in the accompanying drawings, in which, Figure 1 is a vertical section showing my feeding and crushing device. Fig. 2 is a plan view of the mill, the hopper being removed and a crushing cylinder being shown partly broken away and partly in section. Figs. 3 and 4 are detail perspective views showing a portion of one side of the frame and a portion of the curved plate, said plate being shown detached from the frame. Figs. 5 and 6 are perspective views showing opposite faces of a feeder block.

In these drawings A represents a supporting frame upon which is mounted a hopper A' provided upon opposite sides with inwardly and downwardly extending partitions A² which guide the fruit to the proper side of the cylinder B' fixed to rotate with a shaft B which is journaled in the frame and passes transversely through the hopper.

The outer surface of the cylinder B' is cut or roughened in any suitable manner and a curved plate C having a curvature corresponding to that of the cylinder B' is provided at its upper edge with a flange C' which extends the length of the plate and projects at the end. The side members of the frame A are provided with curved slots C² which receive the ends of the plate C, the projecting end portions of the flange resting upon said side members. This prevents any movement of the plate C with respect to the frame, and the said plate is held at the desired distance from the cylinder B' and all fruit fed into the hopper travels downwardly between the cylinder B' and the plate C. The plate C upon its inner face is cut or roughened to correspond with the roughened face of the cylinder B' and between the two the apples are reduced to a pulp suitable for passing between presser rolls.

In order to positively feed the fruit between the cylinder and plate C I employ feed blocks D preferably two in number and which rest side by side. These blocks upon their rear faces are provided with sets of ears D' and their inner faces are concaved as shown at D². Adjacent their lower ends the blocks are perforated as shown at D³ and a pin D⁴ passes through said perforations thereby pivoting the blocks. The lower edges of the blocks are beveled from opposite sides as shown at D⁵ in order that they will more readily rock upon the flange C² above which they are mounted and upon which they may rest, thus forming a knife edge which bears upon the flange and therefore relieves the pivot pin D⁴ of a portion of the strain.

To rock the blocks D I employ a shaft E which is provided with oppositely arranged crank portions to which are pivotally connected rods E' which in turn are pivotally connected between the ears D'. It will thus be obvious that the blocks D will be rocked in opposite directions one moving inwardly toward the cylinder B as the other moves outwardly. This arrangement of the blocks also serves to feed the fruit uniformly along the entire length of the cylinder B', the fruit being fed first adjacent one end and then adjacent the other, as the blocks alternately come into open and closed position, thus preventing all of the fruit poured into the hopper from collecting at one end of the cylinder as might be the case where the fruit in large quantities is dumped into the hopper at one side.

I also show at F suitable rollers over which runs a conveyer G which in connection with suitable rollers H form means for conveying the pulp from the grinding and crushing device and for incidentally extracting the juice therefrom, said pressing device not being claimed as a part of this invention.

I also provide upon the end of the shaft B opposite the handle J, a balance wheel K. It will be obvious from the above that the form of gearing used for transmitting power from the shaft B to the various rollers is not a material part of this invention but may be changed by substituting therefor any well known arrangement of belting or gearing, as the operation of the parts are not dependent upon any particular form of gearing.

Having thus fully described my invention, what I claim as new and desire to secure by Letters Patent, is:—

1. A device of the kind described comprising a hopper divided into upper and lower compartments, a grinding cylinder arranged in the lower compartment and receiving material upon one side only from the upper compartment, a fixed toothed concave inclosing a portion of the said side of the cylinder, concaved feed blocks rocking on the upper edge of the fixed concave, and means for rocking said block in opposite directions with respect to each other.

2. The combination with a grinding cylinder, a fixed concave inclosing the lower portion of one side of said cylinder, the upper edge of the concave being flanged, a pivot pin parallel to said flange, feed blocks mounted to rock on said pins, and beveled to form a knife edge resting on the flange, and means for rocking said feed blocks.

ROBERT W. BROOKS.

Witnesses:
 JAMES R. IRELAND,
 GEORGE A. FRENCH.

---

Copies of this patent may be obtained for five cents each, by addressing the "Commissioner of Patents, Washington, D. C."